United States Patent [19]

Libal et al.

[11] 3,882,714
[45] May 13, 1975

[54] POROSIMETER

[75] Inventors: Werner Libal; Robert Hausner, both of Leoben, Austria

[73] Assignee: Veitscher Magnesitwerke-Actien-Gesellschaft, Vienna, Austria

[22] Filed: Nov. 13, 1973

[21] Appl. No.: 415,303

[30] Foreign Application Priority Data
Nov. 29, 1972 Austria ............................. 10174/72

[52] U.S. Cl. .................................................. 73/38
[51] Int. Cl. ............................................ G01n 15/08
[58] Field of Search ........................... 73/38, 432 PS

[56] References Cited
UNITED STATES PATENTS

| | | | |
|---|---|---|---|
| 3,388,586 | 6/1968 | Golmard et al. | 73/38 |
| 3,525,251 | 8/1970 | Marcu et al. | 73/38 |
| 3,643,493 | 2/1972 | Vitovsky | 73/38 |
| 3,707,870 | 1/1973 | Herve et al. | 73/38 |

Primary Examiner—Richard C. Queisser
Assistant Examiner—Marcus S. Rasco
Attorney, Agent, or Firm—Kurt Kelman

[57] ABSTRACT

A porosimeter comprises a vacuum system and a measuring system to which a fluid pressure may be delivered during the measuring operation. The measuring system includes a dilatometer consisting essentially of a vessel for receiving a porous sample and mercury, a capillary tube removably placed on the vessel and forming a fluid-tight seal therewith and a filling capillary having a pointed tip inserted in the capillary tube. It further includes a measuring capillary containing mercury, a multi-way valve selectively connecting the filling capillary to the measuring capillary and the fluid pressure source, and a control for maintaining the mercury level in the dilatometer constant during the operation. Connection of the filling capillary to the measuring capillary raises the level of mercury in the dilatometer until it reaches the filling capillary tip and connection of the filling capillary to the fluid pressure source raises the pressure in the dilatometer and thus depresses the mercury level to cause the mercury to enter into the pores of the sample.

23 Claims, 1 Drawing Figure

3,882,714
PATENTED MAY 13 1975
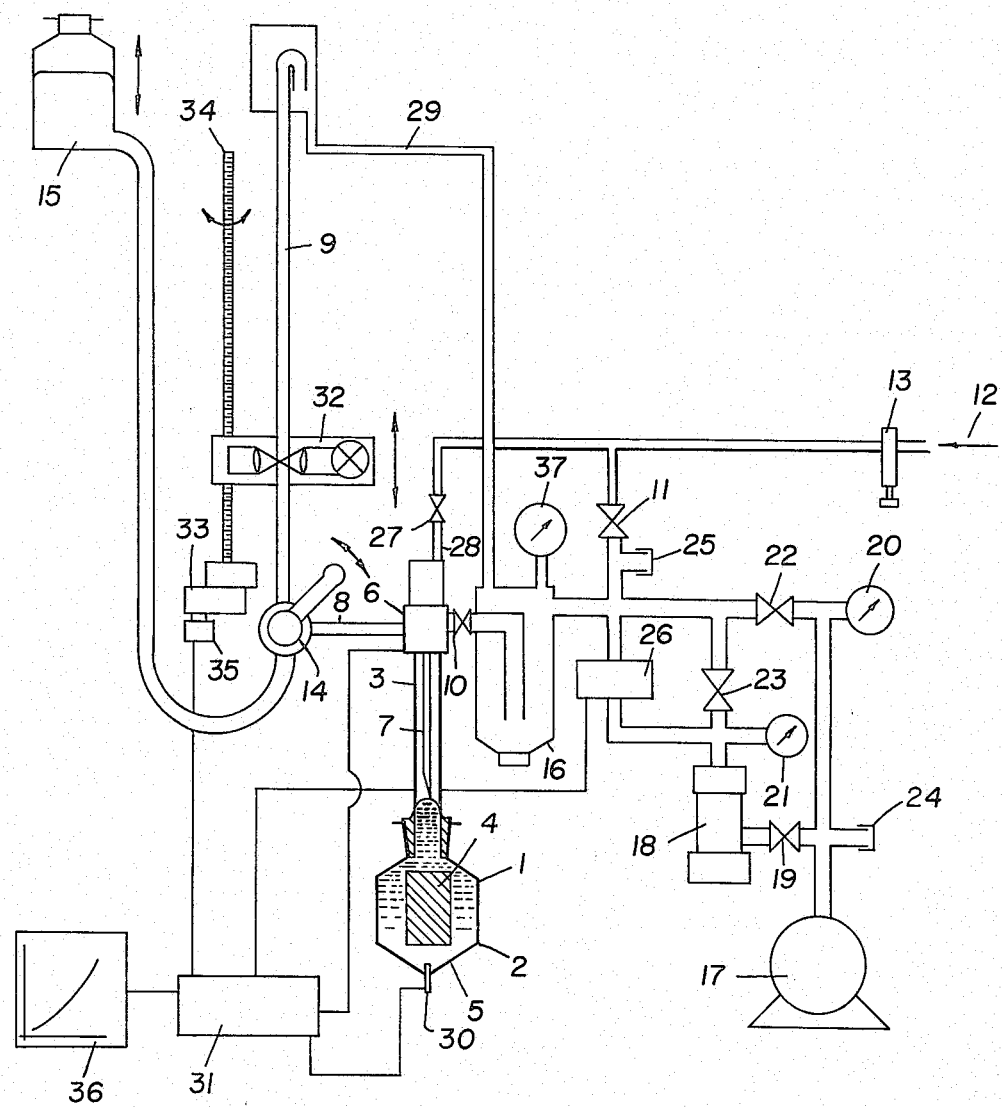

POROSIMETER

The present invention relates to porosimetry, i.e., the measurement of the porosity of solid bodies as well as granular materials, and more particularly to an improved porosimeter.

Porosity measurements are required, for instance, in the fabrication of mineral raw materials to make ceramic or refractory bodies, the porosity of such bodies determining their usefulness to a considerable extent. Therefore, it is important to determine the available open pore space, i.e., the apparent porosity, of such shaped bodies and/or the granular raw material used for their preparation.

This invention is concerned with improving pressure porosimetry, and most particular low pressure porosimeters.

In pressure porosimetry, a measuring liquid, usually mercury, which does not wet the sample whose porosity is to be measured is introduced under pressure into the open pores of the sample, the force effective over the cross section of the pores due to the applied pressure p being counteracted by the surface tension along the pore perimeters. If the pores are ideally assumed to be cylindrical, with an average radius r, an equilibrium between these forces is achieved when $$r = \frac{2\sigma \cos\theta}{p}$$

wherein $\sigma$ is the surface tension force, $\sigma = 480$ dyn/cm in the case of mercury, and $\theta$ is the rim or wetting angle of the measuring liquid in respect of the solid body, $\theta = 140°$ on the average for mercury. Depending on whether the pressure force p, is measured in atmospheres (at) or in Torr (1 mm Hg), 1 at = 981 mbar, 1 Torr = 1.33 mbar, the average pore radius r, expressed in $\mu$m is as follows:

$$r = \frac{7.5}{p \text{ (at)}} = \frac{5520}{p \text{ (Torr)}} \mu m$$

The above equation shows each pressure force value to be associated with a given pore size so that the pore size may be measured or indicated by the applied pressure during the measuring operation. At the same time, the amount of measuring liquid pressed into the pores under this applied pressure is the measure or indication of the volume of the open pores which are larger or at least as large as the size of the pores which corresponds to the applied pressure. This measuring liquid amount causes a corresponding lowering of the level of the measuring liquid in the porosimeter. If the pressure is permitted to be increased over a wide range of values and the lowering of the measuring liquid level corresponding to each pressure increase value is measured or indicated, the resultant parameters will indicate the total open porosity as well as the pore size distribution.

Mercury pressure porosimeters, which form the basis for the present invention, include a vacuum portion for pressures up to one atmosphere and a measuring portion for superatmospheric pressures. The sample is placed into a dilatometer, for instance of glass, which comprises a vessel and a capillary tube placed on the vessel and forming a fluid-tight seal therewith. The dilatometer is first evacuated to a vacuum of about $10^{-3}$ Torr and then filled with mercury until the mercury level has reached a measuring marker near the upper end of the dilatometer capillary tube. Air is now slowly supplied to the dilatometer under pressure until the pressure has been increased stepwise to atmospheric pressure, this increasing pressure forcing the mercury into the pores of the sample and the amount of the penetrating mercury being determined by measuring the corresponding lowering of the mercury level in the dilatometer capillary tube. After the measurement in this lower pressure porosimeter has been completed, the dilatometer is again filled with mercury until its level has reached the measuring marker, is disconnected from the filling device, and placed into the pressure tank of a high pressure porosimeter.

In the high pressure porosimeter, the pressure is built up by means of an oil pump which applies superatmospheric pressures to the mercury in the dilatometer. The pressure is again increased intermittently so that the mercury penetrates into the pores of decreasing diameter. Again, the corresponding lowering of the mercury level in the dilatometer capillary and the corresponding pressure force values are the indicators of the porosity and pore size distribution. If desired, the determined values may be recorded. The measuring operation may be highly automated, for instance by providing an electrical control circuit controlling a sensor spindle in response to the lowering of the mercury level. When the mercury level is lowered, the control circuit is opened and the sensor spindle is rotated until contact is reestablished between its tip and the mercury surface, whereupon the control circuit is closed again and the spindle rotation ceases. The number of rotations of the spindle is directly proportional to the lowered mercury level. After the spindle rotation has stopped, the pressure is increased again, causing the mercury level to sink, which interrupts the control circuit and starts the above procedure all over again.

The high pressure porosimeter permits the application of pressures up to about 2,000 atmospheres, which makes it possible to measure pore size distributions in the range of average pore radii between 3.75 nm and 7.5 $\mu$m. In the low pressure porosimeter, pore size distribution in the range of an average size about 7.5 $\mu$m are measured. The upper limit of the pore sizes measurable by the conventional low pressure porosimeter described hereinabove is determined by the initial pressure exerted upon the sample at the start of the measuring operation by the mercury column in the dilatometer capillary. In such porosimeters, the level of the mercury at the beginning of the operation is spaced, for instance, 140 mm from the center of the sample, i.e., the average initial pressure is 140 Torr. This means that all pores having an average pore radius above about 40 $\mu$m are filled with mercury at the start of the operation and, thus, are not taken into account in the pore size distribution measurement.

Thus, while the hereinabove described high pressure porosimeter operates satisfactorily and requires no changes, the low pressure porosimeter has a number of disadvantages, in addition to the one hereinabove indicated. The latter disadvantage cannot be avoided by shortening the initial height of the mercury column because the mercury filling the pores during the measuring operation must be taken from this column and not enough mercury would be available for this operation if the column were too short. Another disadvantage resides in the fact that the height of the mercury column is not constant during the measuring operation but is gradually reduced. The variable height of the mercury column produces pressure components which influence the measured values and these values, therefore, require correction. These corrections are complex because each measured value requires a different correction factor corresponding to the respective height of the mercury column.

A large portion of the porosity of refractories often is in the range of average pore sizes above about 7.5 $\mu$m, which can be measured only in low pressure porosimeters. The corresponding pore volume cannot be filled with mercury during the measuring operation with the amount of mercury available in a dilatometer capillary of the usual inner diameter of 3 mm, for instance. The available mercury amount cannot be increased by lenghtening the capillary because this would increase the initial pressure even more, thus further reducing the measurable pore size range. Therefore, it was necessary either to reduce the size of the sample or to increase the inner diameter of the dilatometer capillary from, say, 3 mm to 6 mm. This reduced the measuring accuracy, particularly in the high pressure measuring range when the sample has a small pore volume in the range of small pores below about 7.5 $\mu$m. A sample which is too small, on the other hand, unfavorably influences the reproducibility of the measurement because such a small sample may not be representative of the entire porous material from which is has been taken.

The above and other disadvantages are overcome in accordance with this invention by providing an external measuring capillary independent and separate from the dilatometer capillary. With this in view, the invention provides a porosimeter useful particularly for the low pressure measuring operation, wherein a source of fluid pressure and a source of vacuum are connectable to a dilatometer consisting essentially of a vessel for receiving a porous sample and a measuring liquid, preferably mercury, which does not wet the sample, a capillary tube removably placed on the vessel and forming a flight-tight seal therewith, and a filling capillary having a preferably pointed tip inserted in the capillary tube. A separate measuring capillary contains the measuring liquid and a multi-way valve selectively connects the filling capillary to the measuring capillary and to the fluid pressure source. Valve means is arranged for selective disconnection of the fluid pressure source, from, and connection of the vacuum source to, the multi-way valve, connection of the filling capillary to the measuring capillary causing the measuring liquid to flow from the measuring capillary through the filling capillary into the dilatometer to raise the level of the measuring liquid therein until it reaches the tip of the filling capillary, and connection of the filling capillary to the fluid pressure source raising the fluid pressure in the dilatometer and thus depressing the measuring liquid level in correspondence to the increased fluid pressure, this pressure causing the measuring liquid to enter the pores of the sample. A control means maintains the measuring liquid level in the dilatometer substantially constant.

The above and other objects, advantages and features of the present invention will become more apparent from the following detailed description of a now preferred embodiment thereof, taken in conjunction with the single FIGURE of the accompanying drawing showing a porosimeter according to this invention.

The illustrated porosimeter includes a conventional dilatometer 1 comprising lower part 2 and capillary tube 3. The dilatometer receives sample 4 whose porosity is to be measured and measuring liquid 5 in which the sample is immersed. The measuring liquid used herein is mercury. The upper end of dilatometer capillary 3 is closed by multi-way valve 6 one of whose outlets is in communication with filling capillary 7 projecting into capillary tube 3 towards the lower part of the dilatometer. Another outlet of valve 6 is in communication with conduit 8 leading to measuring capillary 9, while a third outlet of the valve is connected to a source of fluid pressure 12, valves 10 and 11 being interposed between valve 6 and fluid pressure source 12.

The fluid pressure source may be the ambient atmosphere, if desired, or preferably a source of compressed air connected to the measuring system by means of pressure reduction valve 13.

Multi-way valve 14 is interposed between conduit 8 and measuring capillary 9, another outlet of valve 14 leading to reservoir 15 holding a supply of mercury so that the measuring capillary may be selectively connected to the mercury reservoir or valve 6 leading to capillary tube 3.

Pressure equalizing container 16 is mounted between valves 10 and 11 in the conduit leading from valve 6 to pressure source 12, to equalize the pressure during evacuation and pressure build-up, thus avoiding a sudden fall or rise of pressure in the system and also serving as a trap for the measuring liquid.

The vacuum system is also connected to pressure equalizing container 16. This system includes rotary pump 17 and diffusion pump 18 to produce and maintain the desired vacuum in the porosimeter. Manometers 20 and 21 are associated with a respective one of the pumps to measure the vacuum, a valve 19 being interposed between the pumps to enable them to be separated from each other, and valves 22 and 23 connecting a respective one of the pumps to container 16 for connection to the measuring system of the porosimeter.

Valves 10, 11, 19, 22 and 23 may usefully be solenoid valves.

Ventilating valves 24 and 25 are provided to enable the porosimeter to be vented when the pressure and vacuum systems are disconnected by closing the respective valves connecting them to the porosimeter.

Differential pressure gage 26 is arranged between the measuring and vacuum systems of the porosimeter, one reference point of the gage corresponding to the vacuum at which measurement begins. The measuring system comprises dilatometer 1, multi-way valve 6, measuring capillary 9 and pressure equalizing container 16, together with the valves interconnecting these parts, while the vacuum system comprises pumps 17 and 18, as well as the valves interconnecting them. Pressure differential gage 26 measures the pressure prevailing in the measuring system of the porosimeter in relation to the vacuum, gage 26 being arranged in parallel to valve 23 connecting diffusion pump 18 to the measuring system.

Before the start of the measuring operation, sample 4 is placed in lower dilatometer part 2, whereupon capillary tube 3 is placed on the lower part. The dilatometer is now connected to the porosimeter, i.e., filling capillary 7, which is connected to multi-way valve 6 is inserted into capillary tube 3, valve 6 being so placed on top of the tube as to form a fluid-tight seal therewith. The interior of the dilatometer is now evacuated by opening valves 10 and 22 and operating rotary pump 17 while keeping valves 11, 19 and 23 closed, i.e., the first evacuating stage is operated only by pump 17. This is continued until a pre-vacuum of about $10^{-1}$ torr. (mm Hg pressure) has been reached, the pressure reduction produced by pump 17 being read on manometer 20 associated therewith. At this point, diffusion pump 18 is switched into the vacuum system by closing valve 22 and opening valves 19 and 23 until a high vacuum of $10^{-3}$ Torr or less has been obtained, the pressure being read on manometer 21 associated with pump 18.

After the high vacuum has been established in dilatometer 1, it is filled with mercury from reservoir 15, by way of multi-way valve 14, multi-way valve 6 and filling capillary 7, until the level of the mercury in the dilatometer touches the point of the filling capillary and while the high vacuum is maintained. As illustrated, the inner end of capillary 7 is beveled so as to present a point and the length of the capillary may, for instance, be such that the capillary point is spaced about 40 mm above the center of the sample. Thus, the mean initial pressure will be 40 Torr. According to the formula given hereinabove, all open pores of an average pore radius smaller than about 140 $\mu$m will thus be encompassed in the following porosity measurement.

Valve 14 is now operated to disconnect mercury reservoir 15 from valve 6 and to connect it to measuring capillary 9 to fill the same with mercury. Finally, valve 14 is adjusted to disconnect reservoir 15 and to interconnect measuring capillary 9 with valve 6. Multi-valve 14 remains in the latter position during the entire measuring operation in the low-pressure porosimeter, i.e., the measuring liquid required for the porosity measurement is obtained from measuring capillary 9 only. Measurement may now start.

Valve 6 is opened to permit a small amount of mercury to flow from capillary 9 and through valve 14 into filling capillary 7 which dispenses the flowing mercury into dilatometer capillary tube 3 to raise the level of mercury in the dilatometer, thus immersing the pointed tip of capillary 7 in mercury. Valve 23 is now closed and valve 11 is opened to increase the pressure in dilatometer 1 until the level of the mercury in capillary 3 is lowered to the point where the tip of filling capillary 7 again just touches the mercury, this lowering of the mercury level being due and corresponding to the amount of mercury penetrating into the pores of sample 4 in response to the increased pressure in the dilatometer vessel. At the same time, the amount of mercury delivered from measuring capillary 9 into dilatometer vessel 1, which corresponds to the amount of mercury pressed into the pores of sample 4, i.e., the pore volume filled with mercury during this step, is measured as a function of the lowering of the level of mercury in capillary 9. The pressure increase during this step is measured by pressure gage 26. Vacuum pumps 17 and 18 remain in operation even after valve 23 has been closed, i.e., after the vacuum system has been disconnected from the measuring system, to maintain a reference point "vacuum" at the pressure differential gage 26.

The next measuring step proceeds with another delivery of a small amount of mercury from measuring capillary 9 into dilatometer 1 to raise the level of mercury again, and so forth for each succeeding measuring step. Each succeeding pressure measurement with gage 26 is effected at the point when the tip of capillary 7 just touches the mercury level. Therefore, the height of the mercury column on sample 4 remains constant throughout the entire measurement, always corresponding to the distance between the center of the sample and the tip of filling capillary 7, which distance may be 40 mm. The pressure applied to the sample at any moment is the sum of the constant pressure of this mercury column and the pressure measured by gage 26.

It is useful to construct the porosimeter so that residues of mercury remaining in filling capillary 7 during the step when mercury is delivered from measuring capillary 9 to dilatometer 1 may be removed from capillary 7. In the illustrated embodiment, such residues of mercury may be blown out of capillary 7 through briefly opening solenoid valve 27 mounted between multi-way valve 6 and pressure source 12 in parallel to pressure equalizing container 16. This brief opening of valve 27 will deliver a small amount of air, preferably compressed air, through throttling conduit 28 into filling capillary 7 to blow any mercury therein out of the capillary. This avoids any measuring errors due to mercury remaining in the filling capillary between measuring steps. At the same time, the small amount of air supplied to the dilatometer in this cleansing step serves to start the pressure increase required for the successive measuring steps. The required full pressure increase is then produced by opening valve 11 in the manner described hereinabove.

Valve 10 has no function during the preparatory and measuring steps, and remains always open. It merely serves as an auxiliary means whose closing makes it possible to detach the dilatometer from the porosimeter installation without venting the remainder of the measuring system.

The measuring capillary 9 is calibrated and preferably has an inner diameter of 3 mm and a usable height of 400 mm. The same pressure as, or a higher pressure than, prevails in the dilatometer vessel may be applied against the mercury column in measuring capillary 9 to assure a free flow of mercury from this capillary into filling capillary 7. This may be accomplished by connecting the open upper end of capillary 9 to a fluid pressure source. The illustrated embodiment shows a simple expedient accomplishing this result by connecting the open upper end of capillary 9 with the measuring system of the porosimeter, preferably pressure equalizing container 16, by conduit 29. This conduit will also serve to feed any mercury spilling out of measuring capillary 9 into container 16.

The height of the mercury column in capillary 9, i.e., any changes in the mercury level, may be read by optical means, i.e., with a cathetometer. The mercury level in dilatometer capillary 3 may be adjusted to the tip of filling capillary 7 by optical means, too, for instance by a mirror placed behind it, the pressure increase being manually regulated. However, it is preferred to make the measurement in the porosimeter largely automatic. For this purpose, multi-way valve 6 is constructed as a solenoid valve, preferably a needle valve, and filling capillary 7 is made of electrically conductive material to constitute a circuit make-and-break electrode in respect of the mercury level in dilatometer capillary 3. Dilatometer 1 carries electrode 30 affixed to the bottom of dilatometer part 2. Electronic measuring and control unit 31 is connected to solenoid valve 6 and electrode 30 in a control circuit so that valve 6 is controlled in response to the relative position of the mercury level in capillary 3 to the tip of electrically conductive capillary 7. Valve 6 is operated when this tip makes or breaks contact with the mercury level so as to control the flow of mercury from capillary 9 into capillary 7 in the above-described manner. Pressure differential gage 26 is also electrically connected to measuring and control unit 31.

Photosensitive sensor unit 32 is associated with measuring capillary 9 to register the mercury level in the capillary, a suitable unit for registering changes in the mercury level being connected to unit 32, such as a potentiometer. In the preferred illustrated embodiment, sensor unit 32 is mounted on a spindle 34 which is rotated by drive motor 33 to move unit 32 along measuring capillary 9. Potentiometer 35 is electrically connected to measuring and control unit 31 and associated with spindle 34. Thus, a change in the level of sensor 32, which corresponds to the level of the measuring liquid in capillary 9, corresponds to a certain rotation of spindle 34 and this is transmitted to potentiometer 35 connected to measuring and control unit 31.

During the preparation of the porosimeter for measuring, dilatometer 1 is filled with mercury so that the control circuit incorporating unit 31 is closed as soon as the tip of electrically conductive filling capillary 7 touches the surface of the mercury in the dilatometer. Unit 31 thereupon operates solenoid valve 6 so as to close the passage between conduit 8 and capillary 7 to interrupt further delivery of mercury into the dilatometer.

As measuring commences, valve 6 is sequentially opened by unit 31 to deliver intermittently small amounts of mercury from measuring capillary 9 into the dilatometer, this unit also controlling the pressure increase subsequent to each delivery of small amounts of mercury by opening valves 27 and 11. When this pressure increase has built up to the point where the mercury level is depressed so as to break the contact between the tip of capillary 7 and the surface of the mercury in the dilatometer, the control circuit is broken, causing valves 27 and 11 to close so as to prevent any further build-up of pressure. The pressure value at this point is electrically determined by gage 26, this value corresponding to a certain pore radius of sample 4. The change in the mercury level in measuring capillary 9 is measured by servomotor controlled photosensitive sensor unit 32 by way of potentiometer 35. The signals from gage 26, which are a function of the pressure values indicating the pore sizes, and from sensor unit 32, which are a function of the pore volume filled with mercury coming from measuring capillary 9, are transmitted to measuring and control unit 31 which feeds them to a read-out device, preferably a recorder 36 which has a coordinate system on which the measuring curve is plotted. In a coordinate system having a X-axis and a Y-axis, the voltage of potentiometer 35 is recorded on the abscissa to produce a parameter corresponding to the mercury volume received in the pores of the sample, and the pressure value determined by gage 26 is recorded on the ordinate.

In the low pressure porosimeter of the present invention, measurements are made up to a maximum pressure limit which, in case compressed air is used as pressure source 12, may be above atmospheric pressure. The measuring system of the porosimeter, preferably pressure equalizing container 16, may be connected to contact manometer 37 set to this maximum pressure limit for terminating the measuring operation automatically. If it is desired to operate with a high pressure porosimeter, the capillary tube 3 of dilatometer 1 may carry a marker at the upper end thereof and may be filled with mercury up to the level of this marker, whereupon the dilatometer containing sample 4 may be inserted in the high pressure porosimeter.

If measurements in a low pressure porosimeter are carried out only up to the ambient air pressure, the amount of mercury which is pressed into the pores of sample 4 during filling of dilatometer capillary 3 up to the upper marker and the corresponding pressure increase must be determined and taken into account by means of a differential measurement at capillaries 9 and 3. This correction in the measurement readings is unnecessary is measurements in a low pressure porosimeter operating with a pressure limit considerably exceeding atmospheric pressure because filling of dilatometer capillary tube 3 is effected at atmospheric pressure after the dilatometer 1 has been depressurized while measurement in a high pressure porosimeter begins at a pressure corresponding to the upper limit pressure in a low pressure porosimeter.

The hereinabove described porosimeter may be used to measure the porosity of porous bodies, for instance by cutting a sample from such bodies for purposes of porosity measurement, as well as that of loose masses, such as granular material. The schematically illustrated dilatometer will be useful for measuring the porosity of solid bodies, such as shown as sample 4. For measuring a sample of granular material, it will be useful if the dilatometer capillaries have an extension reaching down towards the bottom of the lower part of the dilatometer vessel so as to prevent entry of any granular material into the capillaries.

Among the outstanding advantages of the porosimeter of this invention are the following:

Dilatometer 1 is filled with measuring liquid only up to the level determined by the tip of filling capillary 7 and the height of the measuring liquid column remains constant in the low pressure range during the entire measuring procedure, resulting in a constant additive pressure correction parameter. Since the measuring liquid level may be close to the sample, i,e., 40 mm above the center of the sample, the measuring range is extended to larger pore sizes. For instance, a mercury column of 40 mm above the sample center makes it possible to encompass measurements of open pores of an average pore radius smaller than 140 $\mu$m. Particularly in the measurement of granular materials this is a realistic limiting value in the often difficult distinction between pores and sample surface, the portion of the pores above 140 $\mu$m being assigned to the sample surface.

The length of filling capillary 7 may be varied considerably and this makes it possible to predetermine the initial pressure according to the measuring problem encountered.

Since the measurement of the measuring liquid pressed into the pores of the sample is taken at an external measuring capillary 9, it is possible to effect measurements on samples whose pores have primarily radii in the range above 7.5 $\mu$m at a large enough amount of the sample. Also, a dilatometer capillary having an inner diameter of 3 mm may be used, such a capillary being needed for the subsequent measurement in a high pressure porosimeter. In this way, high measuring accuracy is obtained with the entire range or pore radii from 3.75 nm to 140 μm.

Furthermore, the measuring range may be adapted to the measuring problem by replacing measuring capillary 9.

In addition, since the low pressure porosimeter of the invention may operate also with superatmospheric pressures, up to two atmospheres or more, the pressure range between one and two atmospheres, which is very inaccurately covered in high pressure porosimeters, can thus be bridged.

Finally, the porosimeter of this invention lends itself to automation.

While the present invention has been described and illustrated in connection with a now preferred embodiment, it will be clearly understood that many modifications and variations may occur to those skilled in the art, particularly after benefiting from this teaching, and such modifications and variations are within the metes and bounds of this invention as defined in the appended claims.

What is claimed is:
1. A porosimeter comprising
   1. a source of fluid pressure,
   2. a source of vacuum,
   3. a dilatometer consisting essentially of
      a. a vessel for receiving a porous sample and a measuring liquid which does not wet the sample,
      b. a capillary tube removably placed on the vessel and forming a fluid-tight seal therewith, and
      c. a filling capillary having a tip inserted in the capillary tube,
   4. a measuring capillary containing the measuring liquid,
   5. a first multi-way valve selectively connecting the filling capillary to the measuring capillary and to the fluid pressure source,
      a. valve means being arranged for selective disconnection of the fluid pressure source from, and connection of the vacuum source to, the multi-way valve,
      b. connection of the filling capillary to the measuring capillary causing the measuring liquid to flow from the measuring capillary through the filling capillary into the dilatometer to raise the level of the measuring liquid therein until it reaches the tip of the filling capillary, and
      c. connection of the filling capillary to the fluid pressure source raising the fluid pressure in the dilatometer and thus depressing the measuring liquid level in correspondence to the increased fluid pressure, this pressure causing the measuring liquid to enter the pores of the sample, and
   6. control means for maintaining the measuring liquid level in the dilatometer substantially constant.

2. The porosimeter of claim 1, further comprising a reservoir for the measuring liquid and a second multi-way valve selectively connecting the measuring capillary to the measuring liquid reservoir and to the first multi-way valve, connection of the reservoir to the measuring capillary causing the measuring liquid to flow from the reservoir into the measuring capillary and connection of the measuring capillary to the first-multi-way valve causing the measuring liquid to flow from the measuring capillary through the first multi-way valve into the filling capillary.

3. The porosimeter of claim 1, further comprising a pressure equalizing container interposed between the first multi-way valve and the fluid pressure source.

4. The porosimeter of claim 1, further comprising a valve interposed between the filling capillary and the fluid pressure source for blowing residual measuring liquid out of the filling capillary upon briefly opening the valve.

5. The porosimeter of claim 1, further comprising a pressure equalizing container interposed between the first multi-way valve and the fluid pressure source, and a valve interposed between the first multi-way valve and the fluid pressure source in parallel with the pressure equalizing container, the valve being in communication with the first multi-way valve for blowing residual measuring liquid out of the filling capillary upon briefly opening the valve.

6. The porosimeter of claim 1, further comprising a pressure differential gage connected to the vacuum source for establishing a reference pressure valve and interposed between the fluid pressure source and the first multi-way valve, and gage indicating the difference between the pressure delivered to the first multi-way valve from the fluid pressure source and the vacuum established at the beginning of the measuring operation.

7. The porosimeter of claim 1, further comprising a fluid pressure source connected to an open upper end of the measuring capillary.

8. The porosimeter of claim 7, wherein the latter fluid pressure source is the fluid pressure source connectable to the filling capillary.

9. The porosimeter of claim 8, further comprising a pressure equalizing container interposed between the first multi-way valve and the fluid pressure source, the open upper end of the measuring capillary being connected to the pressure equalizing container.

10. The porosimeter of claim 1, further comprising a contact manometer mounted between the fluid pressure source and the first multi-way valve, the manometer being adjustable to set a maximum limit pressure for terminating the measuring operation when the set limit pressure has been reached.

11. The porosimeter of claim 1, wherein the first multi-way valve is a solenoid valve, the measuring liquid is electrically conductive, and the filling capillary is electrically conductive, the control means comprising an electric control circuit including the solenoid valve, the measuring liquid and the electrically conductive filling capillary constituting a circuit make-and-break electrode, the circuit being closed when the tip of the electrode is in contact with the measuring liquid and being broken when the measuring liquid level is below the tip.

12. The porosimeter of claim 11, wherein the first multi-way valve is operated in response to the electrode closing or breaking the control circuit.

13. The porosimeter of claim 11, wherein the first multi-way solenoid valve is a needle valve.

14. The porosimeter of claim 1, further comprising a measuring unit associated with the measuring capillary and recording the level of the measuring liquid therein.

15. The porosimeter of claim 14, wherein the measuring unit comprises a photosensitive sensor.

16. The porosimeter of claim 14, wherein the measuring unit comprising means producing an electrical control signal corresponding to changes in the measuring liquid level.

17. The porosimeter of claim 16, wherein the electrical control signal producing means is a potentiometer.

18. The porosimeter of claim 17, further comprising a spindle whereon the measuring unit is mounted and a drive motor for rotating the spindle to move the measuring unit along the measuring capillary.

19. The porosimeter of claim 1, further comprising a pressure differential gage connected to the vacuum source for establishing a reference pressure value and interposed between the fluid pressure source and the first multi-way valve, and valve being a solenoid valve and the gage indicating the difference between the pressure delivered to the solenoid valve from the fluid pressure source and the vacuum established at the beginning of the measuring operation, the gage producing an electrical control signal corresponding to the pore size of the sample, a measuring unit associated with the measuring capillary and producing another control signal corresponding to the pore size of the sample, a measuring unit associated with the measuring capillary and producing another control signal corresponding to the pore volume of the same as a function of the measuring liquid level in the measuring capillary, and a recorder receiving the control signals.

20. The porosimeter of claim 19, wherein the recorder is a recording device including a coordinate system for inscribing thereon a curve illustrative of the received control signals.

21. The porosimeter of claim 1, wherein the tip of the filling capillary is pointed.

22. The porosimeter of claim 1, wherein the measuring liquid is mercury and the height of the mercury column in the dilatometer, measured from the center of the sample therein, is about 40 mm at the beginning of the measuring operation.

23. The porosimeter of claim 1, wherein the inner diameter of the measuring capillary is about 3 mm and the usable height thereof is about 400 mm.

* * * * *